Patented Dec. 26, 1939

2,185,009

UNITED STATES PATENT OFFICE 2,185,009

DI-ALKYLHALOBENZENOID SULPHIDES AND THE PROCESS FOR PRODUCING THE SAME

Jesse H. Babcock and Anthony Loverde, Niagara Falls, N. Y., assignors to Hooker Electrochemical Company, New York, N. Y., a corporation of New York No Drawing. Application December 5, 1936, Serial No. 114,436

20 Claims. (Cl. 260—608)

By di-halobenzenoid alkyl sulphides we wish to be understood as including all those compounds of the class in which two halophenyl alkyl or halobenzenoid alkyl ring structures having chlorine attached to one or more of the carbon atoms composing the ring are linked together through their side chain alkyl groups by one or more sulphur atoms. Examples of such compounds are di-chlorphenyl methyl (di-chlorbenzyl) mono- and poly- sulphide; di-chlorphenyl dimethyl (di-chlorxylyl) mono- and poly- sulphide; di-chlornaphthyl methyl mono- and polysulphide; di-chlornaphthyl polymethyl mono- and poly- sulphide; di-chloranthracyl methyl mono- and poly- sulphide; di-chloranthracyl polymethyl mono- and poly- sulphide, etc.

Di-phenyl methyl monosulphide and disulphide are known to the art, as dibenzyl sulphide and dibenzyl disulphide respectively. These compounds are produced by reaction of phenyl methyl chloride, commonly known as benzyl chloride, made by chlorinating toluene (methyl benzene) in the methyl group, with sodium monosulphide or sodium polysulphide according to the following reactions:

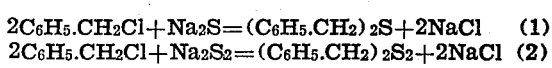

2C$_6$H$_5$.CH$_2$Cl+Na$_2$S=(C$_6$H$_5$.CH$_2$)$_2$S+2NaCl   (1)
2C$_6$H$_5$.CH$_2$Cl+Na$_2$S$_2$=(C$_6$H$_5$.CH$_2$)$_2$S$_2$+2NaCl   (2)

As sodium polysulphide is water-soluble and benzyl chloride is insoluble in water but soluble in alcohol, it has heretofore been customary to react these two compounds in an aqueous medium containing alcohol, and preferably ethyl alcohol. The alcohol solution of benzyl chloride is miscible with the water solution of sodium polysulphide. In this way both compounds are brought into liquid phase and intimate contact. The product is a crystalline substance melting at 71 to 72° C. and insoluble in water. This process is open to the objection that since the resulting product is slightly soluble in alcohol at ordinary temperatures, when using this process it is necessary to distill off alcohol from the product. This results in a loss of alcohol and also a reduction in yield of the product.

In co-pending application Serial No. 112,441 filed Nov. 23, 1936, there is disclosed a process by which the above reaction can be carried on, with a higher yield, by means of mechanical mixing, in the absence of alcohol or any other solvent for the benzyl chloride and that the resulting product has improved characteristics as compared with the product made in accordance with the prior art. For this purpose the sodium sulphide, together with sulphur in the right proportion to form with it sodium disulphide (if the product is to be the disulphide), is first dissolved in water. The water is preferably at boiling temperature, in which case the solution is subsequently cooled to about 75° C. The benzyl chloride is then added. Being lighter than the polysulphide solution, it tends to form a separate liquid layer above the solution. The benzyl chloride is therefore preferably added gradually, with vigorous agitation to bring the two liquids into intimate contact. The reaction being exothermic, the temperature of the reaction may if desired be controlled by the rate at which the benzyl chloride is added. The preferred temperature of reaction is 75 to 80° C. The reaction is more vigorous if carried out at a temperature of 100 to 110° C., but in that case it is necessary to provide a reflux condenser; a'so, the resulting product is found to have a chocolate color, whereas the product made at 75 to 80° C. is relatively colorless. When the reaction is substantially complete, the products and liquid medium are allowed to cool; whereupon the dibenzyl disulphide crystallizes out. It may then be readily separated from the aqueous medium containing in solution the sodium chloride formed by the reaction.

The reaction may be carried out in an iron reactor at 75 to 80° C. or thereabouts. Under these conditions the product is darkened by iron sulphide which, however, is found to be in suspension and may be readily filtered out. Reactors of glass or enamel are impracticable for the purpose as the sodium polysulphide possesses sufficient alkalinity to attack silica.

The alkalinity of the sodium polysulphide results in the production of a small excess of benzyl alcohol. The yield of dibenzyl disulphide is affected by the degree of concentration of the reagents in the reaction medium. Thus at relatively lower concentrations the proportion of benzyl alcohol formed is greater and the yield of dibenzyl disulphide correspondingly less. The preferred concentrations of the several reagents in the reaction mixture are about 78 parts of sodium sulphide, 32 parts sulphur (if the product is to be the disulphide) and 168 parts of benzyl chloride to 762 parts of water by weight respectively. With these concentrations the process results in an average yield of over 95 percent of the theoretical yield of dibenzyl disulphide.

We have now discovered that in place of benzyl chloride, chlorphenyl methyl chloride (chlorbenzyl chloride) may be used in this reaction. This is made by chlorinating toluene preferably first in the ring in darkness in the presence of a catalyst and then chlorinating it a second time in the methyl group under actinic light. After the first chlorination in order to separate the product from the catalyst, a distillation is customary. This affords an opportunity at the same time to separate out any unchlorinated toluene and divide the chlorinated toluene into fractions, so that the next step in the process may be carried out with a product the molecules of which have the same number of chlorine atoms; nevertheless, these chlorine atoms are not all in the same position. The product is therefore a mixture of isomers. The chlorbenzyl chloride thus produced, when reacted with sodium monosulphide, or sodium polysulphide, produces a new product which we call "di-chlorbenzyl monosulphide" or "di-chlorbenzyl disulphide", according to the following typical equations:

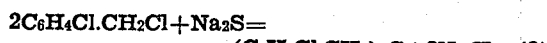
(C₆H₄Cl.CH₂)₂S+2NaCl  (3)
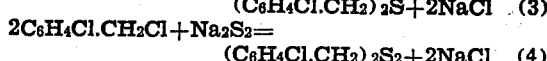
(C₆H₄Cl.CH₂)₂S₂+2NaCl  (4)

The above reactions are analogous to Reactions 1 and 2 except that chlorine has been introduced into and remains in the carbon ring. When the reaction is complete, the products and liquid medium are allowed to cool, whereupon the di-chlorbenzyl disulphide separates out from the aqueous medium containing in solution the sodium chloride formed by the reaction. The resulting product is of course likewise a mixture of isomers. Instead of being a crystalline substance, it is a liquid at ordinary temperatures immiscible with water and therefore forming a lower layer beneath the medium. When the chlorine content corresponds to that of one chlorine atom per molecule it has a sp. gr. of 1.274 at 25° C., an index of refraction of 1.615 at 20° C., begins to boil, with, however, some decomposition, at about 240° C., and is miscible with lubricating oils over a wide range.

In our process the preferred concentrations in the reaction mixture are 78 parts of sodium sulphide, 32 parts of sulphur (if the product is to be the disulphide), 204 parts of monochlorbenzyl chloride and 762 parts of water by weight respectively. It should be noted that these proportions provide an excess of sodium disulphide relative to chlorbenzyl chloride over the one-molecule-to-two proportion called for by Reaction 2. As in the process of the co-pending application, a small proportion of an alcohol (in this case chlorbenzyl alcohol) is formed.

In place of monochlorbenzyl chloride, Reactions 2 and 3 may if preferred be carried out with dichlorbenzyl and trichlorbenzyl chloride, etc.

Analogous products may be made by our process from halogenated alkylbenzenoid hydrocarbons of the type illustrated by xylene (dimethyl benzene), methylnaphthalene, dimethylnaphthalene, methylanthracene, dimethylanthracene, etc., that have been chlorinated both in the methyl group or groups and in the carbon ring, by reaction with sodium monosulphide or polysulphide. In this case the products are di-chlorxylyl, di-methylchlornaphthalene, di-chlornaphthyl methyl, di-chlornaphthyl dimethyl, di-chloranthracyl methyl, di-chloranthracyl dimethyl monosulphide or disulphide respectively. These also are liquid at ordinary temperatures and miscible with mineral oils over a wide range.

The product di-chlorxylyl disulphide made from chlorphenyl dimethyl chloride (chlorxylyl chloride), is especially valuable because of the cheapness of the raw material and ease with which it may be chlorinated. Xylene is a six membered carbon ring having two methyl groups, as compared with the single methyl group of toluene. The two methyl groups of xylene may be in any one of three positions, consequently there are three isomeric xylenes. Commercial xylene consists of a mixture of the three. Unlike toluene, which should be chlorinated in the ring first (otherwise benzal chloride and benzotrichloride are likely to be produced) xylene may be chlorinated first under actinic light, mostly in the methyl group, and then, with the light turned off, mostly in the ring, without the use of a catalyst. It is thus possible to produce a mixture of molecules having different numbers of chlorine atoms and having these in different isomeric positions by chlorinating commercial xylene in a single reactor, without a subsequent distillation to separate the product from a catalyst. The resulting chlorxylyl chloride reacts with sodium monosulphide or disulphide in a manner analogous to that of Equations 3 and 4 as follows:

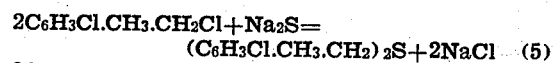
(C₆H₃Cl.CH₃.CH₂)₂S+2NaCl  (5)
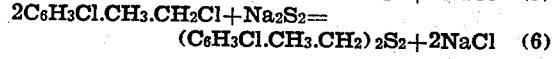
(C₆H₃Cl.CH₃.CH₂)₂S₂+2NaCl  (6)

If both methyl groups are chlorinated the reaction may be as follows:

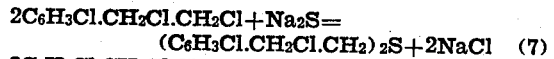
(C₆H₃Cl.CH₂Cl.CH₂)₂S+2NaCl  (7)
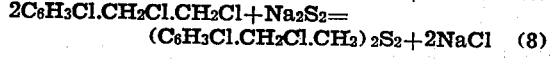
(C₆H₃Cl.CH₂Cl.CH₂)₂S₂+2NaCl  (8)

In Equations 7 and 8 it has been assumed that only one chlorine atom in one methyl group is replaced by sulphur. However, it is possible for a chlorine atom in each of the methyl groups to be replaced by sulphur, thus providing a double linkage between the two benzenoid rings, and this often happens. This reaction would be as follows:

(C₆H₃Cl.CH₂.CH₂)₂S₂+4NaCl  (9)
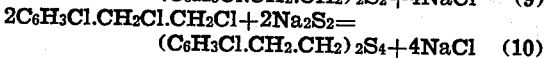
(C₆H₃Cl.CH₂.CH₂)₂S₄+4NaCl  (10)

The product of Equation 5, 6, 7, 8, 9 or 10 will of course be a mixture of molecules having different numbers of chlorine atoms in their rings and having their methyl groups in different positions, some of the methyl groups unchlorinated, some chlorinated and retaining their chlorine atoms, and others giving a double linkage through replacement of chlorine in all their methyl groups by sulphur. Since such mixtures generally have lower melting points and are more soluble in lubricating oil than the pure chemical individuals, they are better for the purpose of increasing the film strength of lubricants than the more expensive pure crystalline products. The mixture produced in this way may be varied by varying the specific gravity to which the xylene is chlorinated in the first place. A typical product made from xylene is made by chlorinating commercial xylene first in the light and then in the dark to a specific gravity of 1.150 at 25° C. and then reacting it with sodium polysulphide, producing a viscous liquid having a specific gravity of 1.200 at 25° C. and boiling at 170° C., with, however, some evidence of decomposition. This is made by reacting 234 parts of Na₂S.9H₂O, 32 parts of sulphur, 140 parts of chlorxylyl chloride mixture and 600 parts of water by weight, preferably between 75° C. and 80° C.

It is well known that sulphur increases the film strength of lubricating oils. The incorporation of elemental sulphur with lubricating oils, however, presents difficulties and the results are not entirely satisfactory. Sulphur chloride has been used, but the resulting sulpho-chlorinated products are very corrosive to metals. The use of dibenzyl disulphide, in which the sulphur is in chemical combination, obviates some of the disadvantages attendant upon the use of elemental sulphur. However, dibenzyl disulphide is a solid, of limited solubility in oils. By our present process therefore we have produced a compound containing sulphur in chemical combination which is a liquid and miscible with lubricating oils at ordinary temperatures.

It is also well known that the halogens, and in particular chlorine, are likewise effective film strengthening agents when added to lubricants. By incorporating the chlorine and sulphur in the same molecule, both may be added at the same time and their joint effect is thus obtained in a convenient and effective manner, since the product is liquid and miscible over a large range of proportions with ordinary mineral lubricating oils.

Our product is non-volatile under ordinary conditions and, unlike the sulpho-chlorinated products, substantially non-corrosive to metals at ordinary temperatures. When incorporated in minor proportion with mineral lubricating oil it is very effective in increasing the film strength, i. e. the load carrying capacity of the oil.

Obviously, bromine or iodine could be used in place of chlorine to bring about the reaction, but chlorine, being much cheaper, is on that account preferred. Likewise, potassium monosulphide or polysulphide could be used in place of sodium monosulphide or polysulphide, but sodium is preferred likewise on account of cheapness.

Since all of the products of our invention are new, it is not limited to the process of the co-pending application referred to but, on the contrary, any di-halobenzenoid alkylmonosulphide or polysulphide comes within the scope of our invention whether made by the process of the co-pending application or by that of the prior art in which alcohol is the medium used. In the latter case there is no chlorbenzyl alcohol present, but the product is nevertheless liquid at ordinary temperatures and miscible with lubricating oils over a wide range.

We are aware that it has been proposed to react sodium monosulphide with sulphuric acid and the resulting hydrosulphide with chlorbenzyl chloride in the presence of the sodium sulphate produced at the same time, to produce chlorbenzyl mercaptan, and that this reaction is said to result in the production of a minor proportion of di-chlorbenzyl monosulphide. The sodium monosulphate remaining, if any, is in an acidic solution with sodium hydrosulphide and sodium sulphate, whereas for high yield of dibenzyl monosulphide for a given consumption of chlorbenzyl monosulphide the sodium monosulphide solution should be alkaline, as it is in our process. The chlorbenzyl chloride remaining after the principal reaction, if any, reacts with the sodium monosulphide under acidic conditions in presence of sodium hydrosulphide, sodium sulphate and chlorbenzyl mercaptan. The yield of di-chlorbenzyl monosulphide, if any, under these conditions would be of no commercial importance.

We claim as our invention:

1. The process for production of di-halobenzenoid compounds in which two halobenzenoid groups are joined through at least one pair of alkyl groups by at least one sulphur atom which comprises reacting a halobenzenoid alkyl halide having at least one halogen atom and at least one halogenated alkyl group attached to the carbon ring with a compound of an alkali metal with sulphur having at least one sulphur atom per molecule, substantially free from hydrosulphide and sulphate, in an aqueous solution, and mechanically separating the product from the aqueous medium containing the by-product.

2. The process for production of di-halobenzenoid compounds in which two halobenzenoid groups are joined through at least one pair of methyl groups by at least one sulphur atom which comprises reacting a halobenzenoid methyl halide having at least one halogen atom and at least one halogenated methyl group attached to the carbon ring with a compound of an alkali metal with sulphur having at least one sulphur atom per molecule, substantially free from hydrosulphide and sulphate, in an aqueous solution, and mechanically separating the product from the aqueous medium containing the by-product.

3. The process for production of di-halobenzenoid compounds in which two halobenzenoid groups are joined through at least one pair of alkyl groups by at least two sulphur atoms which comprises reacting a halobenzenoid alkyl halide having at least one halogen atom and at least one halogenated alkyl group attached to the carbon ring with an alkali metal polysulphide, in an aqueous solution, and mechanically separating the product from the aqueous medium containing the by-product.

4. The process for production of di-halobenzenoid compounds in which two halobenzenoid groups are joined through at least one pair of methyl groups by at least two sulphur atoms which comprises reacting a halobenzenoid methyl halide having at least one halogen atom and at least one halogenated methyl group attached to the carbon ring with an alkali metal polysulphide, in an aqueous solution, and mechanically separating the product from the aqueous medium containing the by-product.

5. The process for production of di-halobenzenoid compounds in which two halobenzenoid groups are joined through two pairs of alkyl groups by sulphur atoms which comprises reacting a halobenzenoid alkyl halide having at least one halogen atom and at least two halogenated alkyl groups attached to the carbon ring with a compound of an alkali metal with sulphur having at least one sulphur atom per molecule, in an aqueous solution, said sulphur compound being in excess of the proportion necessary to replace with sulphur the halogen in one alkyl group of each halobenzenoid alkyl halide molecule, and mechanically separating the product from the aqueous medium containing the by-product.

6. The process for production of di-halobenzenoid compounds in which two halobenzenoid groups are joined through two pairs of methyl groups by sulphur atoms which comprises reacting a halobenzenoid methyl halide having at least one halogen atom and at least two halogenated methyl groups attached to the carbon ring with a compound of an alkali metal with sulphur having at least one sulphur atom per molecule, in an aqueous solution, said sulphur compound being in excess of the proportion necessary to replace with sulphur the halogen in one methyl group of each halobenzenoid methyl halide molecule, and mechanically separating the product from the aqueous medium containing the by-product.

7. The process for production of di-halophenyl compounds in which two halophenyl groups are joined through at least one pair of methyl groups by at least one sulphur atom which comprises reacting a halophenyl methyl halide having at least one halogen atom and at least one halogenated methyl group attached to the carbon ring, with a compound of an alkali metal with sulphur having at least one sulphur atom per molecule, substantially free from hydrosulphide and sulphate, in an aqueous solution, and mechanically separating the product from the aqueous medium containing the by-product.

8. The process for production of di-halophenyl compounds in which two halophenyl groups are joined through at least one pair of methyl groups by at least two sulphur atoms which comprises reacting a halophenyl methyl halide having at least one halogen atom and at least one halogenated methyl group attached to the carbon ring with an alkali metal polysulphide, in an aqueous solution, and mechanically separating the product from the aqueous medium containing the by-product.

9. The process for production of di-halobenzenoid compounds in which two halobenzenoid groups are joined through at least one pair of alkyl groups by at least one sulphur atom which comprises adding a halobenzenoid alkyl halide having at least one halogen atom and at least one halogenated alkyl group attached to the carbon ring to an aqueous solution of an alkali metal compound with sulphur having at least one sulphur atom per molecule, with agitation, in the absence of any mutual solvent for the reagents, the rate of such addition being regulated to maintain a reacting temperature but not to cause boiling, allowing the resulting mixture to cool and the product to form a separate layer and mechanically separating the product from the aqueous medium containing the by-product.

10. The process for production of di-halophenyl compounds in which two halophenyl groups are joined through at least one pair of methyl groups by at least one sulphur atom which comprises adding a halophenyl methyl halide having at least one halogen atom and at least one halogenated methyl group attached to the carbon ring to an aqueous solution of an alkali metal compound with sulphur having at least one sulphur atom per molecule, with agitation, in the absence of any mutual solvent for the reagents, the rate of such addition being regulated to maintain a reacting temperature but not to cause boiling, allowing the resulting mixture to cool and the product to form a separate layer and mechanically separating the product from the aqueous medium containing the by-product.

11. The process for production of di-chlorphenyl compounds in which two chlorphenyl groups are joined through at least one pair of methyl groups by at least two sulphur atoms which comprises reacting a chlorphenyl methyl chloride having at least one chlorine atom and at least one chlorinated methyl group attached to the carbon ring with sodium polysulphide, in an aqueous solution, with the aid of mechanical agitation, at not less than 75° C. but below the boiling point of the mixture, in the absence of any mutual solvent for the reagents, allowing the resulting mixture to cool and the product to form a separate layer and mechanically separating the product from the aqueous medium containing the by-product.

12. The process for production of di-chlorphenyl compounds in which two chlorphenyl groups are joined through at least one pair of methyl groups by at least two sulphur atoms which comprises reacting a chlorphenyl methyl chloride having at least one chlorine atom and at least one chlorinated methyl group attached to the carbon ring with sodium polysulphide, in an aqueous solution, with the aid of mechanical agitation, at 75° to 80° C., in the absence of any mutual solvent for the reagents, allowing the resulting mixture to cool and the product to form a separate layer and mechanically separating the product from the aqueous medium containing the by-product.

13. The process for production of di-chlorphenyl methyl polysulphide containing a small proportion of benzyl alcohol which comprises agitating together substantially 762 parts water, 78 parts sodium sulphide, 32 parts sulphur and 204 parts monochlorphenyl methyl chloride by weight, in the absence of any mutual solvent for the reagents, at substantially 75° to 80° C., allowing the resulting mixture to cool and the product to form a separate layer and mechanically separating the product from the aqueous medium containing the by-product.

14. As a new composition of matter, di-halobenzenoid alkyl polysulphide.

15. As a new composition of matter di-halophenyl alkyl polysulphide.

16. As a new composition of matter di-halonaphthyl alkyl polysulphide.

17. As a new composition of matter di-halo-anthracyl alkyl polysulphide.

18. As a new composition of matter di-chlorphenyl methyl polysulphide.

19. As a new composition of matter di-chlornaphthyl methyl polysulphide.

20. As a new composition of matter di-chloranthracyl methyl polysulphide.

JESSE H. BABCOCK.
ANTHONY LOVERDE.